No. 897,625. PATENTED SEPT. 1, 1908.
C. E. KEEL.
LATHE TOOL HOLDER.
APPLICATION FILED OCT. 17, 1907.
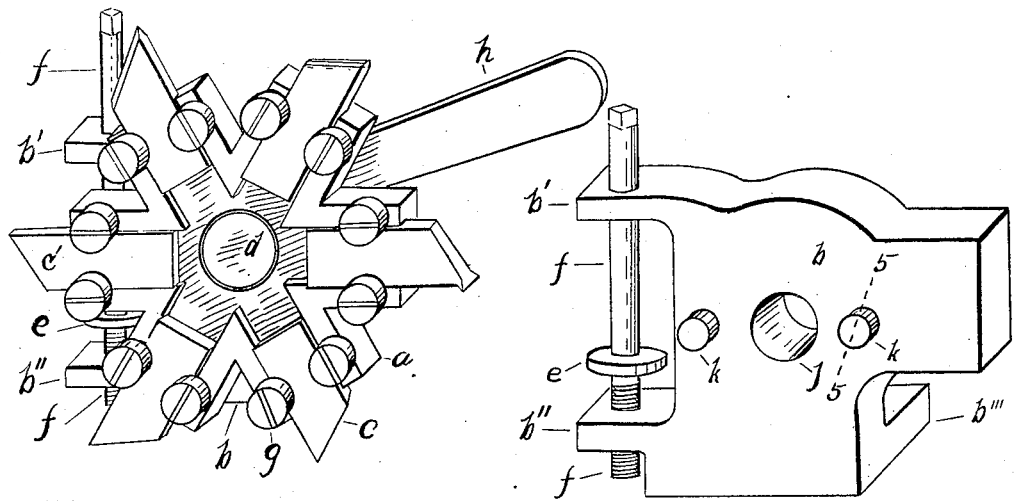
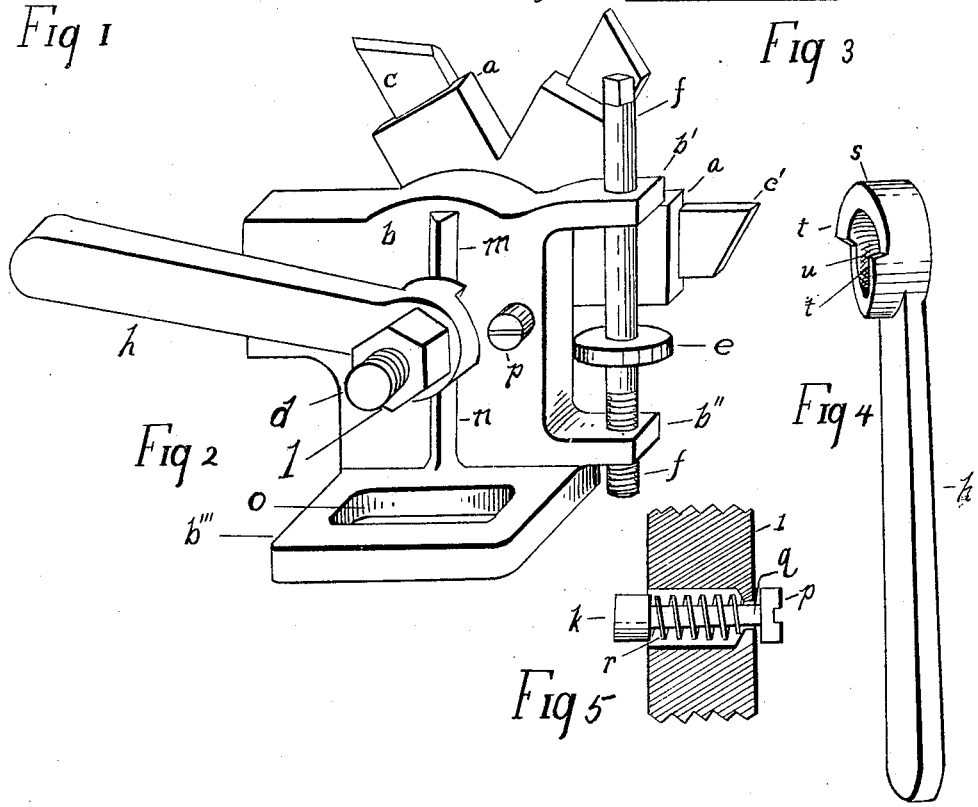
Witnesses
W. M. Gentle.
N. Allemong.
Inventor
Charles E. Keel.
By His Attorney V. H. Lockwood

UNITED STATES PATENT OFFICE.

CHARLES E. KEEL, OF INDIANAPOLIS, INDIANA.

LATHE TOOL-HOLDER.

No. 897,625.

Specification of Letters Patent.

Patented Sept. 1, 1908.

Application filed October 17, 1907. Serial No. 397,777.

*To all whom it may concern:*

Be it known that I, CHARLES E. KEEL, of Indianapolis, county of Marion, and State of Indiana, have invented a certain new and useful Lathe Tool-Holder; and I do hereby declare that the following is a full, clear, and exact description thereof, reference being had to the accompanying drawings, in which like letters refer to like parts.

The object of this invention is to improve the construction of lathe tool-holders with a view to rendering the same very readily adjustable, so that they can be accurately set, and so that they will hold the knife or cutter rigidly in position.

The invention can be used in connection with lathes, planers and shapers of various types, wherein the cutter or knife is held stationary and the thing being acted upon or cut is moved against the knife or cutter.

The full nature of the invention will be understood from the accompanying drawing and the following description and claims.

In the drawings Figure 1 is a perspective view of one side of the device. Fig. 2 is a perspective view of the other side of the device. Fig. 3 is a perspective view of the frame in which the turret head is mounted. Fig. 4 is a perspective view of the clamping lever. Fig. 5 is a section on the line 5—5 of Fig. 3.

A frame $b$ is provided with a horizontal flange $b'''$ having a slot $o$ through which a screw may pass for bolting the frame fast to the saddle of the lathe. However, I do not wish to limit my invention to any particular form of frame or to any particular means or manner of securing it in place, as the same constitutes no essential part of my invention.

In the frame $b$ there is a transverse bearing hole $j$ for the spindle $d$ on which the turret head $a$ is mounted. One end of the spindle $d$ is flush with the face of the turret head, as shown in Fig. 1, while the other end extends beyond the frame $d$ and carries the clamping lever $h$, which is held in place by a set nut $l$ that screws on the threaded end of the spindle $d$, as shown in Fig. 2. On the back side of the frame $b$ there are vertical bearing ribs $m$ and $n$ extending respectively upward and downward from the hole $j$ and against which the side of the head $s$ of the clamping lever $h$ bears. Said clamping lever has a hole $u$ through its head $s$ for fitting on the spindle $d$, and the face of the head $s$ which bears against the ribs $m$ and $n$ is provided with two semicircular cam-shaped surfaces $t$, whereby when said handle $h$ is forced downward, the turret head $a$ will be clamped securely against the side of the frame $b$, which appears in Fig. 3, and be held in that position while a shaft or other article is being cut or treated by one of the knives or cutters $c$ in said turret head. When, however, the handle $h$ is elevated or moved in a direction opposite from the clamping position, it will release the turret head $a$ and enable the operator to turn the turret head so as to bring into the right position the particular knife or cutter $c$ which he wishes to employ; and then the turret head is again clamped against the frame $b$.

To assist in the adjustment of the turret head, the frame $b$ is provided with two transverse apertures, contracted at one side, as shown in Fig. 5, for spring-actuated push rods $q$ carrying the buttons $k$, the spring $r$ and the screw head $p$. The spring $r$, when the turret head is released by lifting the handle $h$, forces the buttons $k$ against the turret head and throws it off from frictional engagement with the frame $b$, whereupon the turret head can be turned to the desired adjustment. When the turret head is clamped against the frame $b$, it forces the buttons $k$ back into the recesses in the frame $b$ against the action of the springs $r$. I do not wish to be limited to the particular spring construction described herein for throwing the turret head away from the frame $b$ during adjustment, as any other spring construction may be employed for that purpose.

The turret head $a$ is provided with radial arms preferably of similar character, and there is a radially extending groove or recess in each arm to receive the knife or cutter $c$. As here shown, there are six arms and six knives or cutters, each independently mounted in the turret head and each held in place by a pair of screws $g$ that screw into the arms of the turret head and each side of the groove therein to receive the knives, or cutters, and said screws $g$ have heads that overlap the edges of the knives so that when the screws are turned down tightly, they will hold the knives in place. This arrangement permits the cutters to be of varying types and to be individually adjusted longitudinally of the arm in connection with which it is mounted in the turret head. Only one of these cutters operates on the article being treated, and as shown in Fig. 1, the operating cutter is the one marked c', at the left. When some other cutter is desired to be employed, the turret head is turned so as to bring that cutter into the position of the particular cutter marked c' in Fig. 1.

In order to properly position the particular operating cutter c', and adjust the height of the arm of the turret head which carries said cutter, I provide a vertical screw rod f beside said particular arm and cutter, as seen in Fig. 2, which is mounted on the extensions b' and b'' from the frame b. The lower end of this screw rod f is threaded, and the hole in the extension b'' through which it passes, is threaded, and the upper end of the screw-rod f is squared to receive a wrench, whereby said screw rod may be screwed up and down. On the adjusting rod f I secure a disk e that is adapted to engage the underside of said arm of the turret head and determine the proper location of said arm so as to bring the cutter in the right position for operating.

The term "cutter" as used herein, is intended to include any sort of tool which may be used on a lathe or planer for treating work.

What I claim as my invention and desire to secure by Letters Patent is:

1. A lathe tool-holder including a frame with a hole through it, a turret head adapted to carry a plurality of cutters and having a spindle projecting through said hole beyond said frame and threaded, a rib on said frame, and a hand lever secured on said spindle with a cam-shaped surface on one side thereof bearing against said rib, whereby when said hand-lever is turned in one position, the turret head will be clamped against said frame, and when turned in another position, the turret head can be turned.

2. A lathe tool-holder including a frame with a hole through it, a turret head adapted to carry a plurality of cutters and having a spindle projecting through said hole beyond said frame, and a rib on said frame, a hand-lever on said spindle with a cam-shaped surface on one side thereof bearing against said rib, and means on said spindle for holding the hand-lever in position, whereby when said hand-lever is turned in one position, the turret head will be clamped against said frame, and when turned in another position, the turret head can be turned.

3. A lathe tool-holder including a frame with a hole through it, a turret head adapted to carry a plurality of cutters and having a spindle projecting through said hole beyond said frame, means on said spindle adapted to coöperate therewith to clamp the head to the frame, and spring-pushed buttons mounted in said frame and acting against said turret head to disengage it from said frame when released by said hand-lever.

4. A tool holder including a frame with a pair of projections one above the other at the end thereof, a cutter head mounted in said frame against the side thereof, said cutter head having radial arms for holding the cutters, a vertically adjustable screw-rod mounted in the extension from said frame beside one of the arms of said cutter, and a disk secured to said screw rod in position to engage one of the surfaces of said frame to adjust its position and hold the cutter in said arm in the proper position for operation.

In witness whereof, I have hereunto affixed my signature in the presence of the witnesses herein named.

CHARLES E. KEEL.

Witnesses:
N. ALLEMONG,
OLIVE BREEDEN.